United States Patent [19]
Kirkland

[11] Patent Number: 4,992,786
[45] Date of Patent: Feb. 12, 1991

[54] ELECTRICAL CONDUCTOR DETECTOR
[75] Inventor: James L. Kirkland, Panama City, Fla.
[73] Assignee: The United States of America as represented by the Secretary of the Navy, Washington, D.C.
[21] Appl. No.: 386,482
[22] Filed: Aug. 3, 1973
[51] Int. Cl.⁵ .............................................. H04B 13/02
[52] U.S. Cl. .............................. 340/850; 114/221 A; 342/459; 324/326; 102/402
[58] Field of Search ............................. 181/0.5 A, 0.5; 114/221 R, 244, 221 A; 367/191; 340/850, 852, 984; 324/326; 342/417, 459; 102/402

[56] References Cited
U.S. PATENT DOCUMENTS
2,801,410 7/1957 Ikeuchi et al. ...................... 340/540
3,108,246 10/1963 Jones ................................ 340/852 X
3,275,097 9/1966 Pavey, Jr. ......................... 181/0.5 A
3,526,831 9/1970 Smith .............................. 340/852 X
3,922,633 11/1975 Higgins ............................. 340/850

Primary Examiner—Brian Steinberger
Attorney, Agent, or Firm—Harvey David; John Becker; Sol Sheinbein

[57] ABSTRACT

Apparatus is disclosed for detecting partially submerged wires and determining the location of the above water portion thereof by injecting into the submerged portion a radio frequency electrical signal, and utilizing radio direction finders to obtain a fix on the resulting radiating above water portion. An insulation cutting probe is used, and a radio frequency injection signal generator is described that minimizes power loss to the water medium.

9 Claims, 1 Drawing Sheet

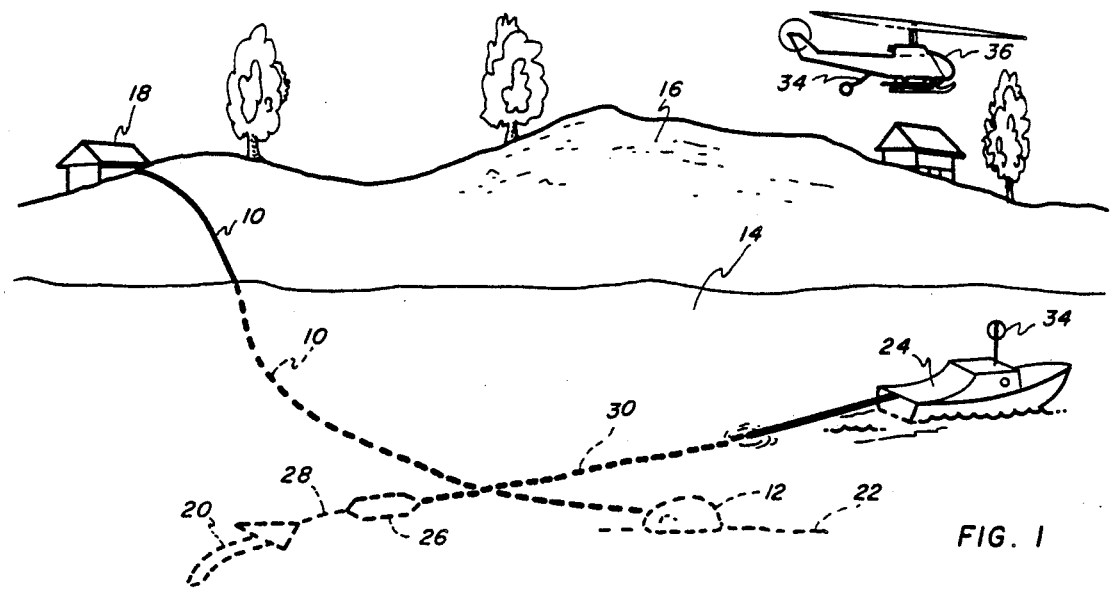
FIG. 1
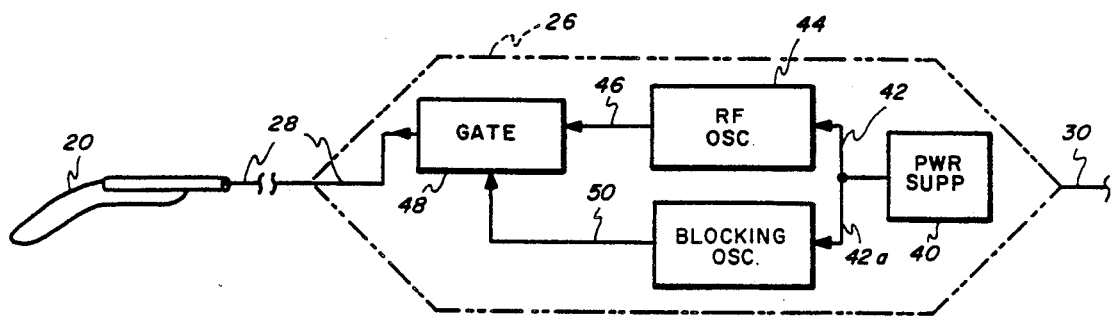
FIG. 2
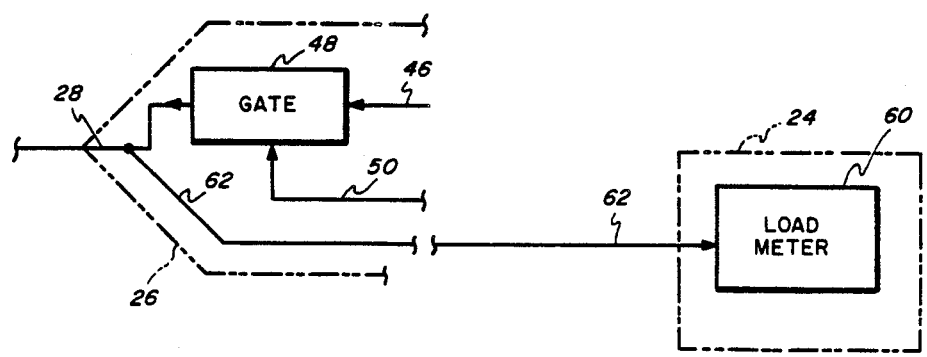

ELECTRICAL CONDUCTOR DETECTOR

STATEMENT OF GOVERNMENT INTEREST

The invention described herein may be manufactured and used by or for the Government of the United States of America for governmental purposes without the payment of any royalties thereon or therefor.

FIELD OF THE INVENTION

This invention relates to the art of detecting and locating of partly submerged or buried objects, and more particularly to the location of electrically conductive objects such as wires that extend for at least part of their length in air. As an example, the invention is applicable to locating control wires that lead from a control station on shore to electrically detonatable underwater mines.

DISCUSSION OF THE PRIOR ART

In the sweeping or neutralizing of wire controlled mines, plow-like devices have been used to cut the control wires. While the plows or cutters are effective for that purpose, they do not provide any indication of just when control wires are cut, nor any information as to where such wires lead from. It would therefore be advantageous to know when a plow or cutter engages a control wire, and also to learn where the above water portion of the wire is located.

Various techniques and apparatus have been proposed heretofore for locating submerged metallic objects such as pipes or wires. These have included dragged electrical probes that are adapted to be bridged by a conductive object and thus to complete an alarm circuit, as shown in U.S. Pat. No. 2,801,410. Another is represented by U.S. Pat. No. 3,108,246, wherein a toothed electrical probe is adapted to ride across an object to be detected and hence to vary current flow, between the object and an electrode, through the sea water as an electrolyte, which varying current is filtered and utilized to operate an indicator. Yet another system, shown in U.S. Pat. No. 3,526,831 injects alternating current into an insulated conductive pipeline and utilizes spaced probes to sense leakage of A.C. electrical energy into the water through breaks in the pipe or cable insulation. That same system also employs inductive coupling between the A.C. energized pipeline and a pickup coil on a search vehicle to enable the vehicle to track the pipeline.

While all of the foregoing systems and techniques are operable and useful in certain circumstances, they are not wholly satisfactory for the location of mine control wires. In addition to obtaining an indicator read-out of some character when a probe, dragged by a search vehicle, engages or passes closely by a submerged wire portion of a mine control wire, it is desirable to be able to obtain a fix on the location of the on shore portion of the wire. None of the mentioned prior art techniques provides such capability.

SUMMARY OF THE INVENTION

The invention aims to avoid many or all of the disadvantages of the prior art through the provision of novel and improved detection and locating apparatus that injects a radio frequency signal into a conductive object, such as a wire or pipeline having some portion extending in exposed condition suitable as a radio frequency electromagnetic energy radiator, and utilizes radio direction finding means to derive a line of position or fix on the radiating portion thereof.

With the foregoing in mind, it is a principal object of the invention to provide apparatus of the foregoing character that results in improved levels of mine control wire detection and location.

Another object of the invention is provision of improved apparatus for detecting partially submerged or buried objects such as pipes or wires, the apparatus including means for making contact with a conductive portion of the object through insulation thereon, and means for providing a radio frequency injection signal that will cause the object to radiate a signal that can be utilized for direction finding purposes.

Still another object is the provision of such apparatus that is economical in its utilization of electrical power.

Yet another object is the provision of detection and location apparatus that is reliable, economical to produce, and is characterized by compactness and ease in handling and operation.

Other objects and many of the attendant advantages will be readily appreciated as the subject invention becomes better understood by reference to the following detailed description, when considered in conjunction with the accompanying drawings.

BRIEF DESCRIPTION OF THE DRAWINGS

FIG. 1 is a diagrammatic view illustrating mine control wire detecting and locating apparatus embodying the invention;

FIG. 2 is a diagrammatic illustration of a probe or cutter energizing circuit forming part of the apparatus of FIG. 1; and FIG. 3 is a diagrammatic illustration of a modified embodiment of the invention.

DESCRIPTION OF THE PREFERRED EMBODIMENT

In the form of the invention illustrated in FIG. 1, there is provided apparatus for detecting and locating an electrical control wire 10 for a mine 12 that is submerged in coastal or riverine water 14. Wire 10 has an electrically insulated portion extending underwater to mine 12, and an insulated portion extending along the ground 16, above water, to a control station 18. Station 18 is shown in this example as a building, but may be otherwise concealed. The portion of wire 10 leading thereto is sometimes exposed, but may be hidden by being buried under a few inches of soil, or by leading through existing ground cover, not shown. Mine 12 is adapted to be exploded upon application of a predetermined electrical signal to wire 10 by occupants of control station 18 in an effort to sink or damage vessels in the vicinity of the mine.

At times it is desirable to inactivate or disable mines such as mine 12 by dragging a wire cutting device from a fast vessel, helicopter, or other platform not likely to suffer damage from explosion of the mine should that occur. On other occasions it is desirable to be able to first detect the presence of the wire and the on shore location thereof as an aid to attacking and neutralizing the control station and its personnel as well as the mine itself.

To this end, the invention comprises a probe in the form of an insulation and/or wire cutter 20 that is adapted to be dragged along the bottom 22 by a suitable vehicle such as a boat 24. Cutter 20 is adapted to be electrically energized with a radio frequency signal by a radio frequency signal generator 26 connected to the cutter by a suitable signal conducting and towing cable 28 and to the boat 24 by a towing cable 30.

Signal generator 26, described more fully with reference to FIG. 2, energizes cutter 20 with a radio frequency injection signal that has high peak energy but is characterized by short pulses. Because of the short pulses of radio frequency energy, the loss of power to the surrounding water medium is minimized.

Cutter 20 is adapted to cut through at least the insulation of wire 10 so as to make electrical contact with the conductor portion thereof, into which the radio frequency injection signal is passed. The portion of wire 10 that extends above water leading to the control station 18 serves, then, as an antenna that radiates electromagnetic energy at the radio frequency provided by generator 26.

A searching type radio direction and/or range finder 34 is carried by boat 24, or other vehicle. Other radio direction and/or range finders 34 may be located at stationary locations or on other vehicles such as a helicopter 36. By obtaining a plurality of cross bearings from radio direction and/or range finders 34, the location of the radiating wire can be established, thereby providing information helpful in locating the control station.

Referring now to FIG. 2, radio frequency injection signal generator 26 comprises an electrical power supply 40, which may comprise batteries, connected as shown via line 42 to an R.F. oscillator 44. Oscillator 44 may conveniently comprise any of a variety of well known resonant circuits, for example a Hartley type oscillator utilizing a tuned LC circuit to establish the frequency output. The output of oscillator 44 is adapted to be applied via line 46, a gate means 48, and cable 28 to cutter 20.

Gate means 48 is under the control of a periodic control signal provided on line 50 from a suitable square wave source or pulse generator such as a blocking oscillator 52, or other form of relaxation oscillator, that derives its power from supply 40 via line 42a. R.F. oscillator 44 is preferably operated at a frequency in the range of 10 KHz to 100MHz, whereas the oscillator 52 is preferably operated at a considerably lesser frequency or pulse repetition rate to effect repetitive gating of short bursts of the output frequency of oscillator 44 to cutter 20 as an R.F. injection signal. For example, a pulse repetition rate of 200 pulses per second, and an on duty cycle of say 5% to 20%, would result in substantial reduction in power loss to the surrounding water medium. Alternatively to gating the R.F. oscillator output, the R.F. source can be a squegging type pulsing oscillator as used in some early radars.

The problem of power loss to the surrounding water medium is, of course, most prevalent in the case of the more conductive water bodies such as salt water. In the case of a fresh water medium of low conductivity, the R.F. injection signal can be continuous without excessive power loss.

In addition to considerations of reduction of power loss, the radio frequency or frequencies chosen should be selected to provide the best impedance match, or achievement of resonance, with the expected target object such as a mine control wire. Doing so will improve or enhance the electromagnetic energy radiation by the above water portion of the wire acting as a transmitting antenna. In this regard, the R.F. oscillator may, in some circumstances, advantageously be of the frequency sweeping type.

It will be recognized that the apparatus is applicable to above water or ground level searching for wires, wherein cutter 20 is dragged in the nature of a plow to cut through insulation of wires lying on or slightly below the ground surface. The radio frequency injection signal is thereby applied to the wire conductor which radiates a signal that can be located by direction finding and/or ranging apparatus 34.

The invention provides the means for detecting and locating a wire 10 without the occupants of the control station being aware that such information has been gained. However, the injection signal can, if desired, be provided with sufficient power to effect triggering of the mine 12 normally controlled by a control wire.

Referring now to FIG. 3, there is illustrated a modified embodiment of the invention. In this embodiment a load meter 60 is carried by the search vehicle 24 and is connected, as shown by line 62 to the output line from gate 48 to cutter 20. Meter 60 is comparable to an antenna load or tuning meter and will show a variation when cutter 20 electrically contacts a wire 10 and injects a radio frequency signal therein. This variation, due to the electrical load change on the output of oscillator 44 through gate 48, may be taken as an indication that a wire has been contacted. Confirmation of the detection or contact of a wire 10 is obtained by radio reception of the radiated R.F. signal from the above water portion of the wire.

The R.F. generator 26 is advantageously disposed close to the cutter 20 to minimize radiation losses along a long cable 28, to avoid cross-talk from such radiation from cable 28 as an antenna, and to make use of the water depth as a natural R.F. attenuating shield for the R.F. generator. In some circumstances, however, it may be desirable to locate the R.F. generator in the towing vehicle 24, and to connect the injection signal to cutter 20 by coaxial cable.

Obviously, other embodiments and modifications of the subject invention will readily come to the mind of one skilled in the art having the benefit of the teachings presented in the foregoing description and the drawings. It is, therefore, to be understood that this invention is not to be limited thereto and that said modifications and embodiments are intended to be included within the scope of the appended claims.

What is claimed is:

1. Apparatus for detecting and determining location of a conductive metal object having at least a portion covered by electrical insulation material, said apparatus comprising:

vehicle means for traversing an area likely to contain said insulated portion of said object;

cutter means, coupled to said vehicle means, for cutting through said insulation means and making electrical contact with said object;

injection signal generating means, connected to said cutter means, for energizing said cutter means with an electrical injection signal having a predetermined radio frequency component whereby upon said contact of said object with said cutter means, said object radiates electromagnetic energy having said radio frequency component; and radio direction finder means for receiving said electromagnetic energy and providing said electromagnetic energy and providing location information with respect to said object.

2. Apparatus as defined in claim 1, and wherein said injection signal generating means comprises:
   a radio frequency oscillator for generating said predetermined radio frequency component;
   a periodic pulse generator for generating a gate control signal characterized by pulses at a repetition rate less than said predetermined radio frequency; and
   gate means, responsive to said gate control signal, for passing pulses of said radio frequency component to said cutter means at said repetition rate.

3. Apparatus as defined in claim 2, and wherein:
   said periodic pulse generator provides said gate control signal with said pulses having a gating duty cycle of from 5% to 20% of a pulse repetition period.

4. Apparatus as defined in claim 3, and wherein:
   said periodic pulse generator comprises a blocking oscillator.

5. Apparatus as defined in claim 4, and further comprising:
   load meter means, disposed on said vehicle means and connected to the injection signal output of said injection signal generator, for providing indications of changes of electrical load thereon, whereby said contact with said object is detectable at said vehicle means from observation of said load meter means.

6. Apparatus as defined in claim 5, and wherein:
   said radio frequency oscillator means comprises a sweep frequency oscillator, and said predetermined radio frequency varies periodically through a predetermined frequency range.

7. Apparatus as defined in claim 6, and wherein said radio direction finder means comprises:
   a plurality of radio direction finding receivers disposed at diverse locations, whereby a fix can be made of the position of said object.

8. Apparatus for detecting and determining location of an above water portion of an electrically conductive wire having a below water portion, said below water portion having an insulating covering, said apparatus comprising:
   a cutting probe having a conductive edge adapted to cut through said insulation and make electrical contact with said below water portion of said wire;
   a towing vehicle connected by a cable to said probe for dragging thereof along a path expected to cross said below water portion of said conductor;
   an injection signal generator comprising a radio frequency oscillator providing a radio frequency signal, gate means for coupling said radio frequency signal to said conductive edge in response to repetitive gating signals, and means for generating said gating signals at a predetermined repetition rate and having a predetermined gating periods, whereby said wire is energized by said injection signal and said above water portion serves as an antenna to radiate electromagnetic energy at the frequency of said radio frequency signal; and
   radio direction finder means, adapted to receive said electromagnetic energy, for indicating direction of said wire from said direction finder means.

9. Apparatus as defined in claim 8, and further comprising:
   a load meter connected to said cutting edge of said probe and carried by said vehicle, said meter being operative to provide indication of contact of said wire by said cutting edge.

* * * * *